US005109725A

United States Patent [19]

Roth et al.

[11] Patent Number: 5,109,725

[45] Date of Patent: May 5, 1992

[54] MOTOR DRIVE UNIT FOR CABLE WINDOW REGULATOR

[75] Inventors: Wolfgang Roth, Asslar-Oberlemp; Thomas Medebach, Wetzlar, both of Fed. Rep. of Germany

[73] Assignee: Kuester & Co. GmbH, Ehringshausen, Fed. Rep. of Germany

[21] Appl. No.: 486,011

[22] Filed: Feb. 23, 1990

[30] Foreign Application Priority Data

Feb. 23, 1989 [DE] Fed. Rep. of Germany ....... 3905589

[51] Int. Cl.[5] ......................... G05G 1/08; F16H 27/02

[52] U.S. Cl. .................................... 74/505; 74/89.20; 74/89.22

[58] Field of Search .................... 74/89.20, 89.22, 411, 74/505; 49/349, 352

[56] References Cited

U.S. PATENT DOCUMENTS 4,216,624 8/1980 Blankenburg et al. ............... 49/352
4,534,233 8/1985 Hamaguchi ........................ 74/89.20
4,770,056 9/1988 Becker et al. ......................... 74/505
4,821,589 4/1989 Fukumoto et al. ............... 74/89.22

FOREIGN PATENT DOCUMENTS 0261525 3/1988 European Pat. Off. ........... 74/89.22
2121870 1/1984 United Kingdom .................. 74/505

*Primary Examiner*—Vinh T. Luong
*Attorney, Agent, or Firm*—Longacre & White

[57] ABSTRACT

A motor drive unit for a window regulator. The drive unit is divided into two subassemblies. The first subassembly includes a driven worm gear and a bearing pin. The second subassembly includes a worm wheel having an extended sheath on which a cable driving drum is mounted. When the two subassemblies are fitted together, the worm wheel and worm gear mesh and the bearing pin extends through and supports the worm wheel, sheath and cable drum.

1 Claim, 2 Drawing Sheets

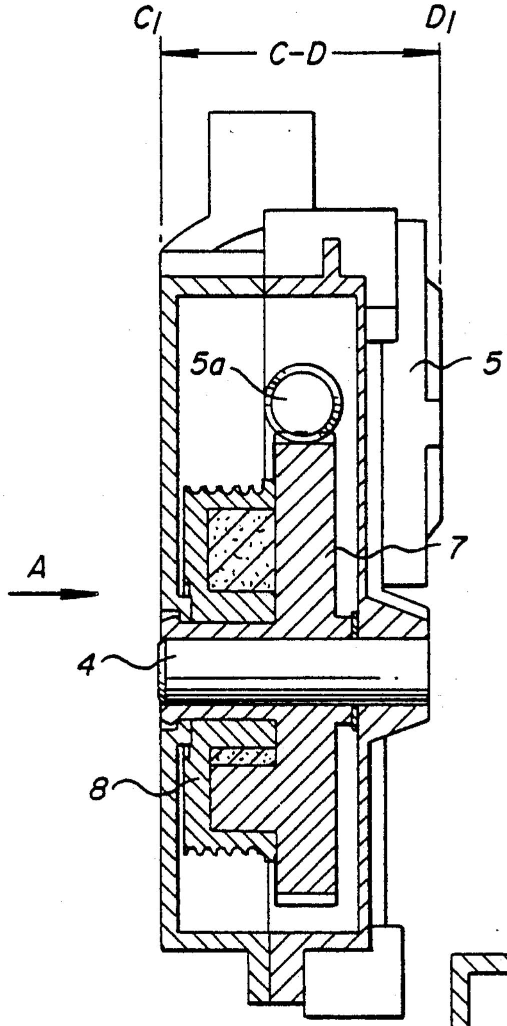
FIG. 1
FIG. 3
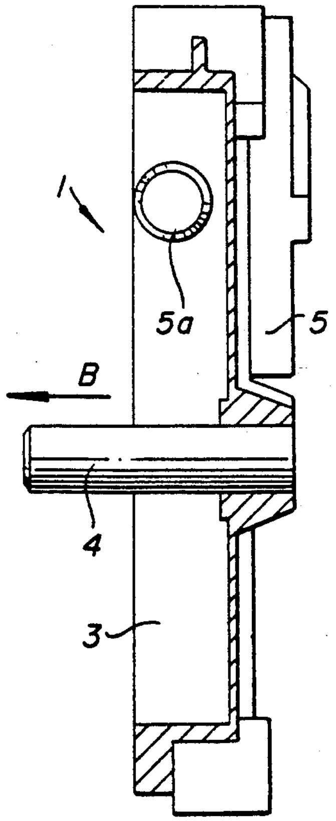
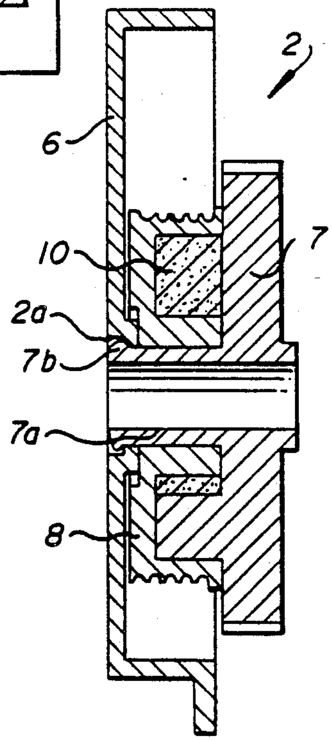
FIG. 2

MOTOR DRIVE UNIT FOR CABLE WINDOW REGULATOR

BACKGROUND OF THE INVENTION

The invention relates to the field of motor driven cable window operators. Specifically, the invention relates to the reduction in the depth dimension of the window drive unit. This is particularly advantageous owing to the fact that the drive unit and motor combination usually reside within the confines of an automobile door where space for apparatus is limited.

DESCRIPTION OF THE PRIOR ART

In state of the art motor driven cable type window regulators, an example of which is disclosed in German Patent 35 19 056, the drive unit is inherently bulky owing to the fact that the unit is comprised of several separate subassemblies which are joined to form a drive unit. Within the unit itself, the various worm gears, worm wheels, and cable drums generally comprise separate elements placed within a larger shell. As such, the completed assemblies take on added dimension and bulk in all directions.

While some of these dimensional accumulations are unchangeable by design, i.e., owing to the selection of a particular motor type to drive the window, other dimensional accumulations can be changed. One example of this dimensional reduction which can be accomplished is the subject of this invention.

A motor drive unit according to the present invention combines several of the previously separate drive unit elements into integral units. As a result, a motor drive unit according to the present invention has a reduced depth dimension as compared with state of the art motor drive units owing to the reduced bulk comprised by the combined elements when assembled.

Also, owing to the reduced number of separately assembled elements, the motor drive unit according to the present invention achieves economies in assembly time and resources.

SUMMARY OF THE INVENTION

A motor drive unit according to the present invention is generally made by the combination of two subassemblies. The first subassembly casing includes the worm drive gear, mounting provisions for an electric motor, and a bearing pin for the worm wheel.

The second subassembly casing includes a worm wheel, a cable drum which is connected to and driven by the worm wheel, and mounting provisions for the window lift cable sheaths which guide the cables to the cable drum. Within this second subassembly, the worm wheel and cable drum are combined into a single piece owing to the provision of an extended support sheath on the worm wheel which supports the cable drum.

Upon connection of the respective first and second subassemblies, the bearing pin mounted on the first subassembly extends towards and through the center of the worm wheel of the second subassembly so as to support the worm wheel.

The end portion of a projecting sleeve of the worm wheel of the second subassembly may also include a set of projecting hook elements which cooperate with corresponding openings located in the casing of the second subassembly so as to hold the worm wheel and the housing of the second subassembly together.

Owing to the reduced number of separate assembly pieces required for a motor drive unit according to the present invention, less assembly time is required. In this manner, motor drive units can be manufactured in a more economical manner.

Further, owing to the combination of previously separate parts within the subassemblies, the subassembly can have a reduced depth dimension. The dimensional savings is approximately 4 to 5 mm over a total depth of the motor drive unit of 40+mm. In this manner, motor drive units according to the present invention can be less than 40 mm deep.

Although such a dimensional reduction is comparatively small, the space in which this reduction is provided, namely the space within the confines of an automobile door, is very limited. Increasingly, this door space is required to accommodate more and more equipment, e.g., loudspeakers, automatic door locks, etc.

BRIEF DESCRIPTION OF THE DRAWINGS

FIG. 1 is a sectional elevational view of an assembled motor drive unit according to the present invention along section A—A of FIG. 4;

FIG. 2 is a cross sectional elevational view of a first motor drive unit subassembly according to the present invention along section A—A of FIG. 4;

FIG. 3 is a cross sectional elevational view of a second motor drive unit subassembly according to the present invention along section A—A of FIG. 4; and, FIG. 4 is a plan view of an assembled motor drive unit according to the present invention.

DETAILED DESCRIPTION OF THE PREFERRED EMBODIMENT

Figure 4:
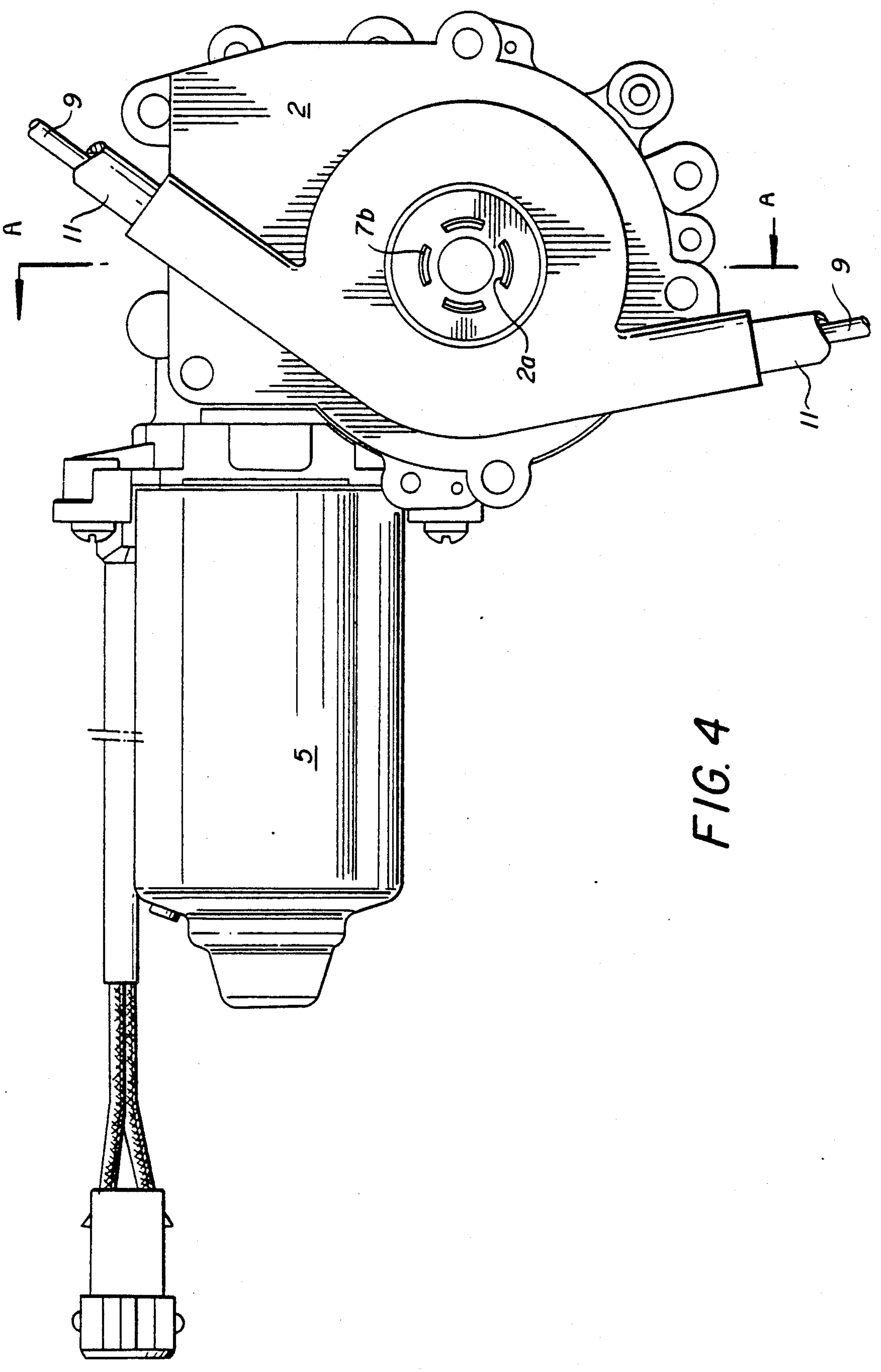

The following description is provided with reference to the drawing figures.

A motor drive unit according to the present invention is comprised of first and second subassemblies, 1 and 2. The first subassembly 1, shown in FIG. 3, includes a housing 3 which accommodates a bearing pin 4 inserted therein. The housing 3 also includes provision for either mounting an electric motor 5 therein, or having the electric motor housing integral therewith. The first subassembly housing also includes a worm gear 5*a* which transmits the drive from electric motor 5.

The second subassembly 2, shown in FIG. 2, includes a housing 6 which includes a passage therein for accommodating the bearing pin 4 of the first subassembly. A worm gear 7 is mounted within the second subassembly, and includes a projecting sleeve member 7*a*. A cable drum 8 is also mounted within the second subassembly, and is mounted directly on the projecting sleeve 7*a* of the worm wheel 7. The worm wheel drives the mounted cable drum 8 through the combination of conflicting drive tabs on either or both of the worm wheel and cable drum and damping members 10.

The first and second subassemblies are mated together as shown by the arrow marked B on the drawing figures. Bearing pin 4 is inserted into the corresponding hole in the second subassembly to form a rigid connection between the respective assemblies. The subassemblies are also held together by suitable fasteners connected between the plurality of cooperating flanges included on the housings of the respective assemblies.

In the embodiment shown, the worm wheel projecting sleeve 7*a* is equipped with hook elements 7*b*. Hook elements 7*b* are inserted into cooperating openings 2*a* in the second subassembly housing 2. In this manner the combined worm wheel 7 and cable drum 8 are both held in fixed relation, and are also prevented from being pulled from the second subassembly housing 6.

FIG. 4 shows a plan view of a motor drive unit according to the present invention. From this view of the unit, the mounting sheaths 11 for the window cables 9 are clearly shown. Also shown are the hook elements *7b* of the worm wheel 7 extending through openings 2*a* in the housing 6 of subassembly 2.

As shown in FIG. 1, the depth dimension of a motor drive unit according to the invention is shown as dimension CD. Since the electric drive motor 5 is mounted with the first subassembly (on the right in the figure), this portion of the drive unit for purposes of dimension reduction is limited by the shape of the motor 5, i.e., the motor extends a predetermined amount beyond the center axis of the worm drive 5*a*. Hence, for depth reduction to be accomplished, the dimensional reduction must come from the side of subassembly 2. As such, the present invention drive unit combines the worm wheel and cable drive unit into an integral pair of elements for reduced dimension and assembly ease.

We claim:

1. A motor drive unit for a cable drive system, comprising in combination:

a first subassembly including a first housing, a worm gear, and a bearing pin extending therefrom; and a second subassembly, for connecting to said first subassembly, including a second housing, a worm wheel supported by said bearing pin and driven by said worm gear when said first and second subassemblies are connected, said worm wheel having a sheath portion extending therefrom, and a cable drum, said cable drum being mounted on said extended sheath and being driven thereby;

said housing of said second subassembly further including an opening through which a free end of said extended sheath portion of said worm wheel extends; and, said free end including at least one hook element which positively engages edge portions of said opening so as to retain said worm wheel and cable drum against removal from said second subassembly.

* * * * *